(12) United States Patent
Swartzlander

(10) Patent No.: US 11,009,034 B2
(45) Date of Patent: May 18, 2021

(54) METHOD OF OPTIMIZING SUPERCHARGER PERFORMANCE

(71) Applicant: Eaton Intelligent Power Limited, Dublin (IE)

(72) Inventor: Matthew Swartzlander, Battle Creek, MI (US)

( * ) Notice: Subject to any disclaimer, the term of this patent is extended or adjusted under 35 U.S.C. 154(b) by 0 days.

(21) Appl. No.: 16/429,641

(22) Filed: Jun. 3, 2019

(65) Prior Publication Data

US 2019/0285077 A1 Sep. 19, 2019

Related U.S. Application Data

(63) Continuation-in-part of application No. 15/210,381, filed on Jul. 14, 2016, now abandoned, which is a continuation of application No. PCT/US2015/011522, filed on Jan. 15, 2015.

(60) Provisional application No. 62/027,755, filed on Jul. 22, 2014, provisional application No. 61/927,653, filed on Jan. 15, 2014.

(51) Int. Cl.
| F04D 27/00 | (2006.01) |
| F04C 28/28 | (2006.01) |
| F04C 18/12 | (2006.01) |
| F02D 23/00 | (2006.01) |
| F02D 41/00 | (2006.01) |

(52) U.S. Cl.
CPC .................. F04D 27/001 (2013.01)

(58) Field of Classification Search
CPC ...... F04D 27/001; F04C 28/28; F04C 18/126; F04C 2240/20; F04C 2270/05; F02B 33/38; F02D 23/00; F02D 41/0007; G01M 15/05; G01M 15/042; Y02T 10/144

USPC .............. 60/605.1; 123/559.1; 418/1, 206.1, 418/206.4, 201.1, 15

See application file for complete search history.

(56) References Cited

U.S. PATENT DOCUMENTS 2,652,192 A 9/1953 Roland
2,690,869 A * 10/1954 Brown .................... F04C 18/20
418/113

(Continued)

FOREIGN PATENT DOCUMENTS

CN 1444700 A 9/2003
EP 1726830 A1 11/2006

(Continued)

OTHER PUBLICATIONS

Chinese OA for CN Application No. 201580004598.4 dated Nov. 16, 2018 with translation, 15 pages.

(Continued)

*Primary Examiner* — Thai Ba Trieu
(74) *Attorney, Agent, or Firm* — RMCK Law Group PLC

(57) ABSTRACT

A method of designing a supercharger that yields a high isometric efficiency based on a fixed pressure ratio, a plurality of rotor leads and a plurality of rotor operating speeds is provided. An efficiency map is generated of rotor lead versus rotor operating speeds for the fixed pressure ratio. A rotor lead value is determined based on the fixed pressure ratio and rotor speed combination from the efficiency map that yields a high isometric efficiency. A supercharger is provided having the determined rotor lead and that is configured to operate with the fixed pressure ratio and the determined rotor operating speed.

20 Claims, 20 Drawing Sheets

(56) References Cited

U.S. PATENT DOCUMENTS

| | | | |
|---|---|---|---|
| 3,424,373 A | | 1/1969 | Gardner |
| 3,807,911 A | | 4/1974 | Caffrey |
| 4,119,392 A | * | 10/1978 | Breckheimer ........ F04C 18/084 418/201.1 |
| 4,768,934 A | | 9/1988 | Soeters |
| 5,078,583 A | | 1/1992 | Hampton et al. |
| 5,893,355 A | | 4/1999 | Glover et al. |
| 6,884,050 B2 | | 4/2005 | Prior |
| 7,488,164 B2 | | 2/2009 | Swartzlander |
| 7,744,356 B2 | | 6/2010 | Ohmi |
| 2003/0152475 A1 | | 8/2003 | Becher |
| 2006/0067835 A1 | | 3/2006 | Duwel et al. |
| 2013/0146035 A1 | | 6/2013 | Eybergen et al. |
| 2015/0118086 A1 | | 4/2015 | Swartzlander |
| 2017/0067464 A1 | | 3/2017 | Swartzlander |
| 2018/0100430 A1 | | 4/2018 | Sheen |

FOREIGN PATENT DOCUMENTS

| | | |
|---|---|---|
| JP | H04298634 A | 10/1992 |
| JP | 07012070 A | 1/1995 |

OTHER PUBLICATIONS

Eaton Corporation, "Eaton TVS Supercharger for Downsizing," Jun. 16, 2009.

European Search Report for European Application No. 15737692.2 dated Oct. 12, 2017, 18 pages.

Froehlich, M. et al., "TVS V-Series Supercharger Development for Single and Compound Boosted Engines," SAE Technical Paper Series, vol. 1, Apr. 8, 2013.

Froelich, M. et al., "TVS V-Series Supercharger Development for Single and Compound Boosted Engines" SAE International 2013-01-0919, Published Apr. 8, 2013.

International Search Report and Written Opinion for International Application No. PCT/US2015/011522 dated Apr. 22, 2015, 13 pages.

* cited by examiner

| Model | CD (mm) | OD (mm) | Length (mm) | Lead (mm) | helix @ PD | helix @ OD |
|---|---|---|---|---|---|---|
| R200 | 36.5 | 54.0 | 81.0 | 150.0 | 32.2 | 37.4 |
| R250 | 36.5 | 54.0 | 100.0 | 225.0 | 27.0 | 27.0 |
| R340 | 43.4 | 64.0 | 96.0 | 216.0 | 32.3 | 32.3 |
| R410 | 43.4 | 64.0 | 117.5 | 264.4 | 27.3 | 27.3 |
| R570 | 51.3 | 75.9 | 115.0 | 258.8 | 32.0 | 31.9 |
| R720 | 51.3 | 75.9 | 145.0 | 326.3 | 26.3 | 26.3 |
| R900 | 58.4 | 86.8 | 136.5 | 307.1 | 30.9 | 30.9 |
| R1040 | 58.4 | 86.8 | 158.5 | 356.6 | 27.2 | 27.2 |
| R1320 | 67.3 | 100.0 | 152.3 | 342.7 | 31.7 | 31.7 |
| R1650 | 67.3 | 100.0 | 190.4 | 428.4 | 26.3 | 26.3 |
| R1900 | 75.0 | 111.7 | 175.0 | 393.8 | 30.9 | 30.9 |
| R2300 | 75.0 | 111.7 | 211.0 | 474.8 | 26.4 | 26.4 |

*FIG - 4*

| Model | Lead (mm) | 4000 | 6000 | 8000 | 10000 | 12000 | 14000 | 16000 | 18000 | 20000 |
|---|---|---|---|---|---|---|---|---|---|---|
| R200 | 150.0 | 10.0 | 15.0 | 20.0 | 25.0 | 30.0 | 35.0 | 40.0 | 45.0 | 50.0 |
| R250 | 225.0 | 15.0 | 22.5 | 30.0 | 37.5 | 45.0 | 52.5 | 60.0 | 67.5 | 75.0 |
| R340 | 216.0 | 14.4 | 21.6 | 28.8 | 36.0 | 43.2 | 50.4 | 57.6 | 64.8 | 72.0 |
| R410 | 264.4 | 17.6 | 26.4 | 35.3 | 44.1 | 52.9 | 61.7 | 70.5 | 79.3 | 88.1 |
| R570 | 258.8 | 17.3 | 25.9 | 34.5 | 43.1 | 51.8 | 60.4 | 69.0 | 77.6 | 86.3 |
| R720 | 326.3 | 21.8 | 32.6 | 43.5 | 54.4 | 65.3 | 76.1 | 87.0 | 97.9 | 108.8 |
| R900 | 307.1 | 20.5 | 30.7 | 41.0 | 51.2 | 61.4 | 71.7 | 81.9 | 92.1 | 102.4 |
| R1040 | 356.6 | 23.8 | 35.7 | 47.6 | 59.4 | 71.3 | 83.2 | 95.1 | 107.0 | 118.9 |
| R1320 | 342.7 | 22.8 | 34.3 | 45.7 | 57.1 | 68.5 | 80.0 | 91.4 | 102.8 | 114.2 |
| R1740 | 450.0 | 30.0 | 45.0 | 60.0 | 75.0 | 90.0 | 105.0 | 120.0 | 135.0 | 150.0 |
| R1900 | 393.8 | 26.3 | 39.4 | 52.5 | 65.6 | 78.8 | 91.9 | 105.0 | 118.1 | 131.3 |
| R2300 | 474.8 | 31.7 | 47.5 | 63.3 | 79.1 | 95.0 | 110.8 | 126.6 | 142.4 | 158.3 |
| R3100 | 393.8 | 26.3 | 39.4 | 52.5 | 65.6 | 78.8 | 91.9 | 105.0 | 118.1 | 131.3 |
| R4000 | 474.8 | 31.7 | 47.5 | 63.3 | 79.1 | 95.0 | 110.8 | 126.6 | 142.4 | 158.3 |

*FIG-7*

| ISEN @ 1.4 PR | Lead (mm) | 4000 | 6000 | 8000 | 10000 | 12000 | 14000 | 16000 | 18000 | 20000 |
|---|---|---|---|---|---|---|---|---|---|---|
| R200 | 150.0 | | | 52.1 | 56.6 | 58.6 | 60.6 | 61.5 | 61.9 | 61.9 |
| R250 | 225.0 | 54.5 | 57.4 | 63.7 | 66.4 | 68.5 | 68.9 | 69.3 | 68.8 | 67.9 |
| R340 | 216.0 | 54.8 | 61.2 | 65.2 | 67.2 | 67.7 | 68.0 | 67.4 | 66.6 | 65.5 |
| R410 | 264.4 | 50.6 | 61.8 | 65.6 | 66.8 | 66.6 | 65.6 | 64.4 | 63.1 | 61.4 |
| R570 | 258.8 | 57.9 | 59.7 | 64.7 | 66.9 | 67.7 | 67.5 | 66.6 | 64.5 | 62.2 |
| R720 | 326.3 | 61.0 | 65.4 | 68.8 | 70.3 | 69.6 | 67.6 | 64.2 | 61.4 | 57.5 |
| R900 | 307.1 | 59.1 | 67.3 | 69.6 | 70.2 | 69.6 | 68.0 | 66.4 | 63.7 | |
| R1040 | 356.6 | 57.7 | 66.2 | 68.2 | 68.4 | 66.7 | 64.3 | 60.6 | 55.7 | 50.5 |
| R1320 | 342.7 | 66.6 | 65.3 | 68.7 | 69.4 | 68.7 | 67.3 | 64.2 | 59.4 | |
| R1740 | 450.0 | | 69.1 | 69.4 | 68.1 | 64.2 | 58.4 | 51.8 | 46.0 | 40.6 |
| R1900 | 393.8 | | 72.9 | 73.8 | 71.8 | 67.7 | 62.0 | 56.0 | 51.3 | |
| R2300 | 474.8 | | 70.8 | 71.8 | 69.0 | 62.9 | 55.5 | 49.9 | 44.7 | |

FIG-9

| ISEN @ 1.4 PR | Lead (mm) | 4000 | 6000 | 8000 | 10000 | 12000 | 14000 | 16000 | 18000 | 20000 |
|---|---|---|---|---|---|---|---|---|---|---|
| R200 | 150.0 | 10.0 | 15.0 | 20.0 | 25.0 | 30.0 | 35.0 | 40.0 | 45.0 | 50.0 |
| R250 | 225.0 | 15.0 | 22.5 | 30.0 | 37.5 | 45.0 | 52.5 | 60.0 | 67.5 | 75.0 |
| R340 | 216.0 | 14.4 | 21.6 | 28.8 | 36.0 | 43.2 | 50.4 | 57.6 | 64.8 | 72.0 |
| R410 | 264.4 | 17.6 | 26.4 | 35.3 | 44.1 | 52.9 | 61.7 | 70.5 | 79.3 | 88.1 |
| R570 | 258.8 | 17.3 | 25.9 | 34.5 | 43.1 | 51.8 | 60.4 | 69.0 | 77.6 | 86.3 |
| R720 | 326.3 | 21.8 | 32.6 | 43.5 | 54.4 | 65.3 | 76.1 | 87.0 | 97.9 | 108.8 |
| R900 | 307.1 | 20.5 | 30.7 | 41.0 | 51.2 | 61.4 | 71.7 | 81.9 | 92.1 | 102.4 |
| R1040 | 356.6 | 23.8 | 35.7 | 47.6 | 59.4 | 71.3 | 83.2 | 95.1 | 107.0 | 118.9 |
| R1320 | 342.7 | 22.8 | 34.3 | 45.7 | 57.1 | 68.5 | 80.0 | 91.4 | 102.8 | 114.2 |
| R1740 | 450.0 | 30.0 | 45.0 | 60.0 | 75.0 | 90.0 | 105.0 | 120.0 | 135.0 | 150.0 |
| R1900 | 393.8 | 26.3 | 39.4 | 52.5 | 65.6 | 78.8 | 91.9 | 105.0 | 118.1 | 131.3 |
| R2300 | 474.8 | 31.7 | 47.5 | 63.3 | 79.1 | 95.0 | 110.8 | 126.6 | 142.4 | 158.3 |

FIG - 16

| VE @ 1.4 PR | Lead (mm) | 4000 | 6000 | 8000 | 10000 | 12000 | 14000 | 16000 | 18000 | 20000 |
|---|---|---|---|---|---|---|---|---|---|---|
| R200 | 150.0 | | | 50.5 | 62.9 | 70.6 | 75.7 | 79.5 | 82.6 | 84.8 |
| R250 | 225.0 | 49.3 | 56.2 | 69.8 | 77.5 | 82.2 | 85.7 | 88.1 | 89.8 | 90.8 |
| R340 | 216.0 | 50.9 | 68.0 | 77.3 | 82.8 | 86.1 | 88.5 | 90.1 | 91.5 | 92.7 |
| R410 | 264.4 | 47.2 | 69.2 | 78.0 | 83.1 | 86.2 | 88.4 | 90.0 | 91.3 | 92.3 |
| R570 | 258.8 | 59.0 | 66.4 | 76.1 | 81.8 | 85.9 | 89.1 | 91.5 | 93.4 | 95.7 |
| R720 | 326.3 | 64.7 | 72.9 | 81.1 | 86.3 | 90.0 | 92.1 | 93.9 | 95.5 | 97.0 |
| R900 | 307.1 | 63.8 | 76.9 | 83.9 | 88.2 | 91.7 | 93.9 | 95.7 | 97.6 | |
| R1040 | 356.6 | 61.1 | 76.6 | 83.9 | 88.1 | 91.0 | 92.9 | 94.9 | 96.2 | 97.2 |
| R1320 | 342.7 | 70.2 | 75.2 | 83.3 | 88.4 | 91.6 | 94.9 | 97.6 | 99.1 | |
| R1740 | 450.0 | | 81.1 | 86.7 | 90.1 | 92.1 | 93.1 | 93.8 | 93.2 | 92.9 |
| R1900 | 393.8 | | 83.6 | 89.0 | 92.6 | 95.0 | 96.5 | 97.9 | 99.1 | |
| R2300 | 474.8 | | 83.5 | 89.2 | 92.4 | 94.8 | 95.7 | 97.6 | 97.6 | |

*FIG - 17*

METHOD OF OPTIMIZING SUPERCHARGER PERFORMANCE

CROSS-REFERENCE TO RELATED APPLICATIONS

This application is a continuation-in-part of U.S. patent application Ser. No. 15/210,381 filed Jul. 14, 2016, which is a continuation of International Application No. PCT/US2015/011522 filed on Jan. 15, 2015 which claims the benefit of U.S. Patent Application No. 61/927,653 filed on Jan. 15, 2014 and U.S. Patent Application No. 62/027,755 filed on Jul. 22, 2014. The disclosures of the above applications are incorporated herein by reference.

FIELD

The present disclosure relates generally to superchargers and more particularly to a method of optimizing the performance of a supercharger based on a given application.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine. In some examples it may be difficult to optimize peak efficiency of a supercharger based on a given application.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of designing a supercharger that yields a high isometric efficiency based on a fixed pressure ratio, a plurality of rotor leads and a plurality of rotor operating speeds is provided. A first supercharger is operated with a first rotor lead at the fixed pressure ratio. A first rotor speed is identified that provides a highest thermal efficiency for the first supercharger. A second supercharger is operated with a second rotor lead at the fixed pressure ratio. A second rotor speed is identified that provides a highest thermal efficiency for the second supercharger. An efficiency map is established that identifies a series of rotor leads and rotor speed combinations that achieve highest thermal efficiencies for a plurality of superchargers operating at the fixed pressure ratio. A rotor lead is determined that achieves peak efficiency for a proposed supercharger application requiring the fixed pressure ratio and a fixed rotor speed based on the efficiency map. A supercharger is provided having the fixed pressure ratio and the determined rotor lead and that is configured to operate at the fixed rotor speed.

According to additional features, the rotor lead can is between 250 mm and 350 mm based on the fixed pressure ratio of 1.4 and the fixed rotor speed of between 9,000 RPM and 12,500 RPM. In another example, the rotor lead is between 375 mm and 350 mm based on the fixed pressure ratio of 1.4 and the fixed rotor speed of between 6,000 RPM and 9,000 RPM. In another example, the rotor lead is between 300 mm and 450 mm based on the fixed pressure ratio of 1.6 and the fixed rotor speed of between 8,000 RPM and 12,000 RPM. In another example, the rotor lead is 275 mm and 325 mm based on the fixed pressure ratio of 1.8 and the fixed rotor speed of 13,000 RPM and 17,000 RPM. In yet another example, the rotor lead is between 375 mm and 425 mm based on the fixed pressure ratio of 1.8 and the fixed rotor speed of between 9,000 RPM and 12,000 RPM.

A method of designing a supercharger that yields a high isometric efficiency based on a fixed pressure ratio, a plurality of rotor leads and a plurality of rotor operating speeds is provided. An efficiency map is generated of rotor lead versus rotor operating speeds for the fixed pressure ratio. A rotor lead value is determined based on the fixed pressure ratio and rotor speed combination from the efficiency map that yields a high isometric efficiency. A supercharger is provided having the determined rotor lead and that is configured to operate with the fixed pressure ratio and the determined rotor operating speed.

According to additional features, the rotor lead can is between 250 mm and 350 mm based on the fixed pressure ratio of 1.4 and the fixed rotor speed of between 9,000 RPM and 12,500 RPM. In another example, the rotor lead is between 375 mm and 350 mm based on the fixed pressure ratio of 1.4 and the fixed rotor speed of between 6,000 RPM and 9,000 RPM. In another example, the rotor lead is between 300 mm and 450 mm based on the fixed pressure ratio of 1.6 and the fixed rotor speed of between 8,000 RPM and 12,000 RPM. In another example, the rotor lead is 275 mm and 325 mm based on the fixed pressure ratio of 1.8 and the fixed rotor speed of 13,000 RPM and 17,000 RPM. In yet another example, the rotor lead is between 375 mm and 425 mm based on the fixed pressure ratio of 1.8 and the fixed rotor speed of between 9,000 RPM and 12,000 RPM.

A method of designing a supercharger that yields a high isometric efficiency based on a fixed pressure ratio, a plurality of rotor leads and a plurality of rotor operating speeds is provided. A first supercharger is operated with a first rotor lead at the fixed pressure ratio. A first rotor speed is identified that provides a highest thermal efficiency for the first supercharger. A second supercharger is operated with a second rotor lead at the fixed pressure ratio. A second rotor speed is identified that provides a highest thermal efficiency for the second supercharger. An efficiency map is established that identifies a series of rotor lead and rotor speed combinations that achieve highest thermal efficiencies for a plurality of superchargers operating at the fixed pressure ratio. An operational speed is determined that achieves peak efficiency for a proposed supercharger application requiring the fixed pressure ratio and a fixed rotor lead based on the efficiency map. A supercharger is provided having the fixed pressure ratio, the fixed rotor lead and that is configured to operate at the determined operational speed.

According to additional features, the rotor lead can is between 250 mm and 350 mm based on the fixed pressure ratio of 1.4 and the fixed rotor speed of between 9,000 RPM and 12,500 RPM. In another example, the rotor lead is between 375 mm and 350 mm based on the fixed pressure ratio of 1.4 and the fixed rotor speed of between 6,000 RPM and 9,000 RPM. In another example, the rotor lead is between 300 mm and 450 mm based on the fixed pressure ratio of 1.6 and the fixed rotor speed of between 8,000 RPM and 12,000 RPM. In another example, the rotor lead is 275 mm and 325 mm based on the fixed pressure ratio of 1.8 and the fixed rotor speed of 13,000 RPM and 17,000 RPM. In yet another example, the rotor lead is between 375 mm and 425 mm based on the fixed pressure ratio of 1.8 and the fixed rotor speed of between 9,000 RPM and 12,000 RPM.

A method of designing a supercharger that yields a high isometric efficiency based on a fixed pressure ratio, a plurality of rotor leads and a plurality of rotor operating speeds is provided. An efficiency map is generated of rotor lead versus rotor operating speeds for the fixed pressure ratio. A rotor operating speed value is determined based on the fixed pressure ratio and rotor lead combination from the efficiency map that yields a high isometric efficiency. A supercharger is provided having the determined rotor lead and that is configured to operate with the fixed pressure ratio and the determined rotor operating speed. The rotor lead is between 250 mm and 350 mm based on the fixed pressure ratio of 1.4 and the fixed rotor speed of between 9,000 RPM and 12,500 RPM.

BRIEF DESCRIPTION OF THE DRAWINGS

The present disclosure will become more fully understood from the detailed description and the accompanying drawings, wherein:

FIG. 4 is a table illustrating differences of superchargers having various measurements;

FIG. 7 is a table illustrating a velocity map for superchargers having various displacements;

FIG. 9 is a table illustrating a comparison of superchargers having various displacements mapped for a given isentropic efficiency;

FIG. 16 is a table illustrating isentropic efficiency at a pressure ratio of 1.4 for superchargers having various displacements;

FIG. 17 is a table illustrating volumetric efficiency at a pressure ratio of 1.4 for superchargers having various displacements;

DETAILED DESCRIPTION

Figure 1:
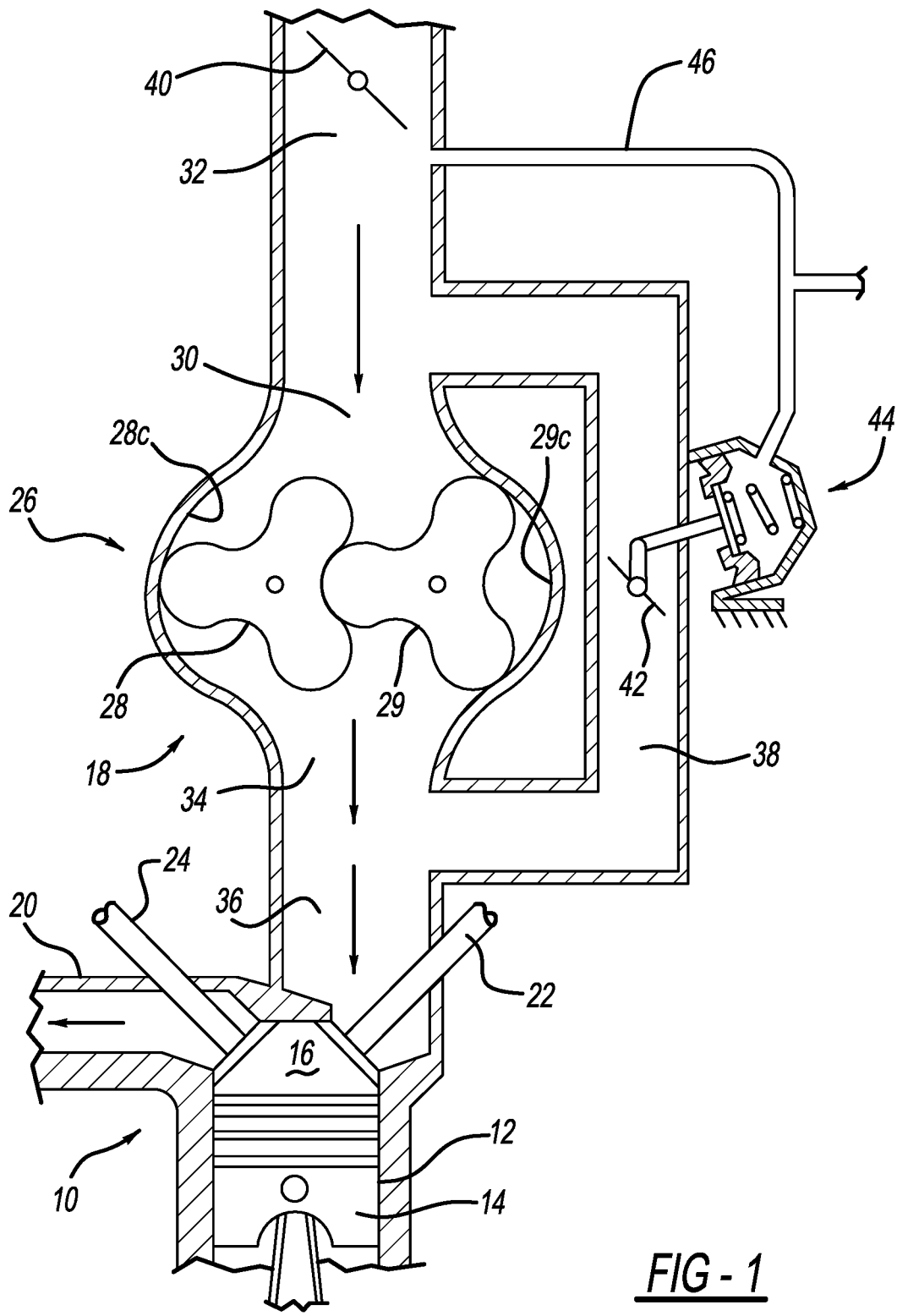
FIG. 1 is a schematic illustration of an intake manifold assembly having a positive displacement blower or supercharger constructed in accordance to one example of the present disclosure.
Figure 1A:
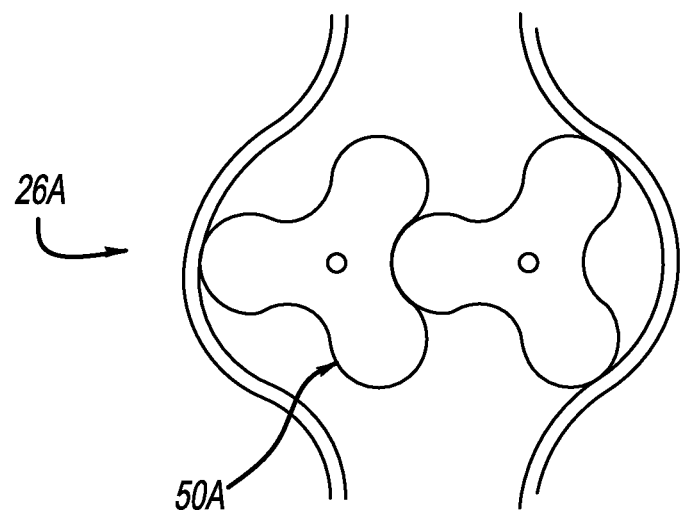
FIG. 1A is a schematic illustration of a first and second exemplary supercharger having respective leads according to one example of the present disclosure.
Figure 1A:
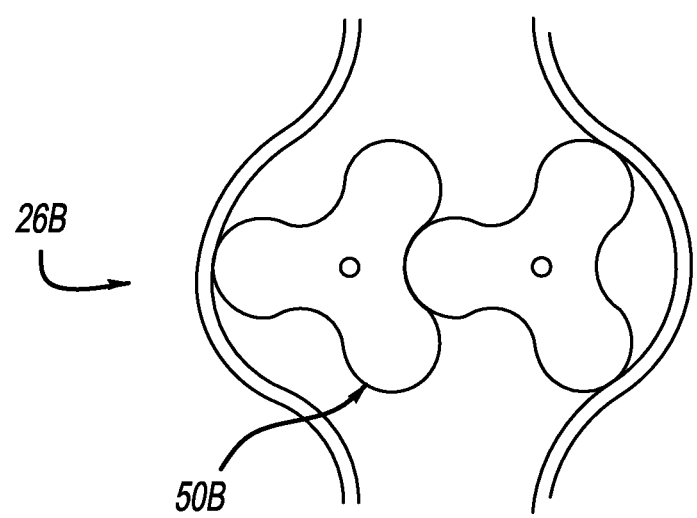
Figure 2:
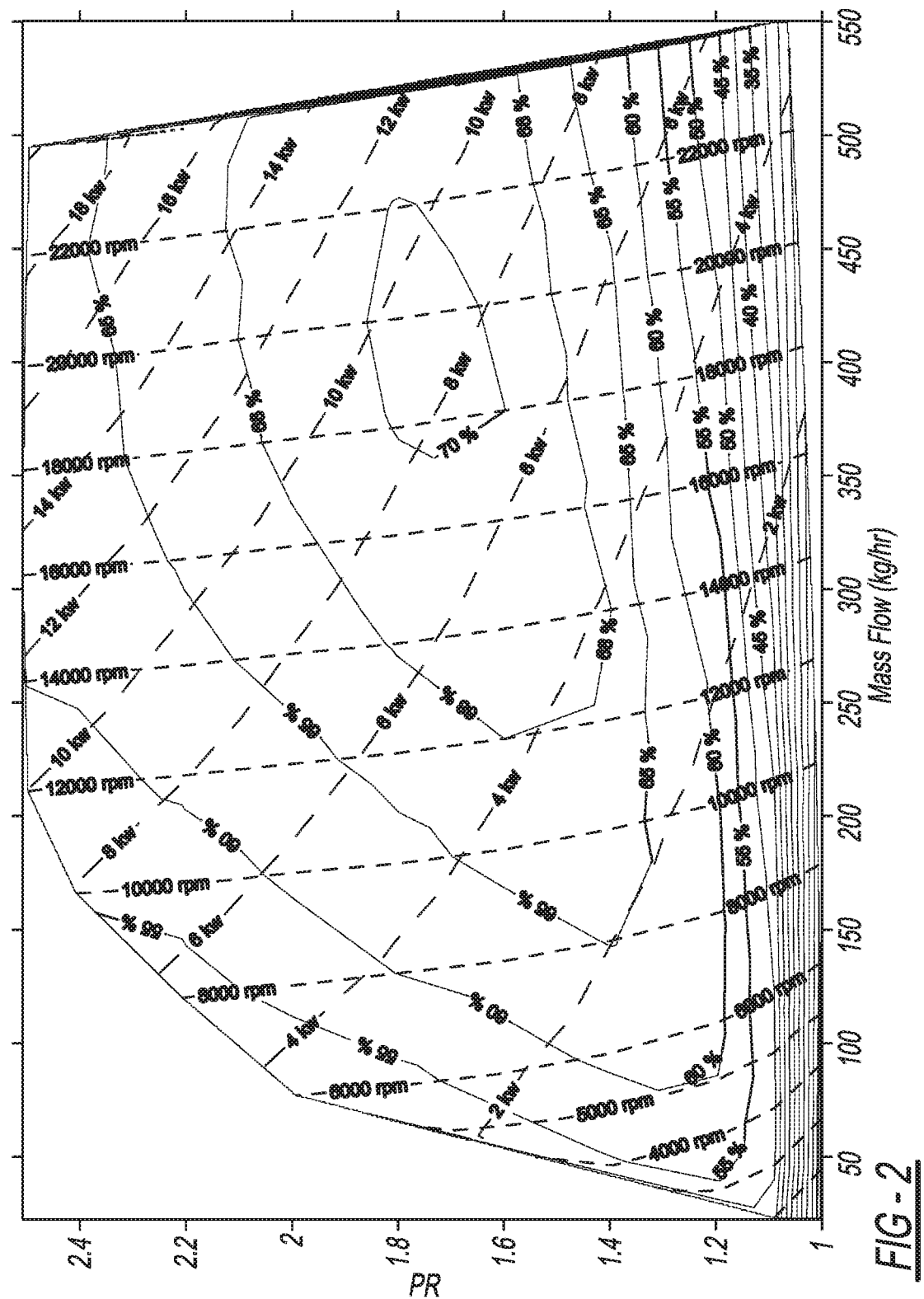
FIG. 2 is an exemplary performance map of a supercharger having 0.34 liter of displacement.
Figure 3:
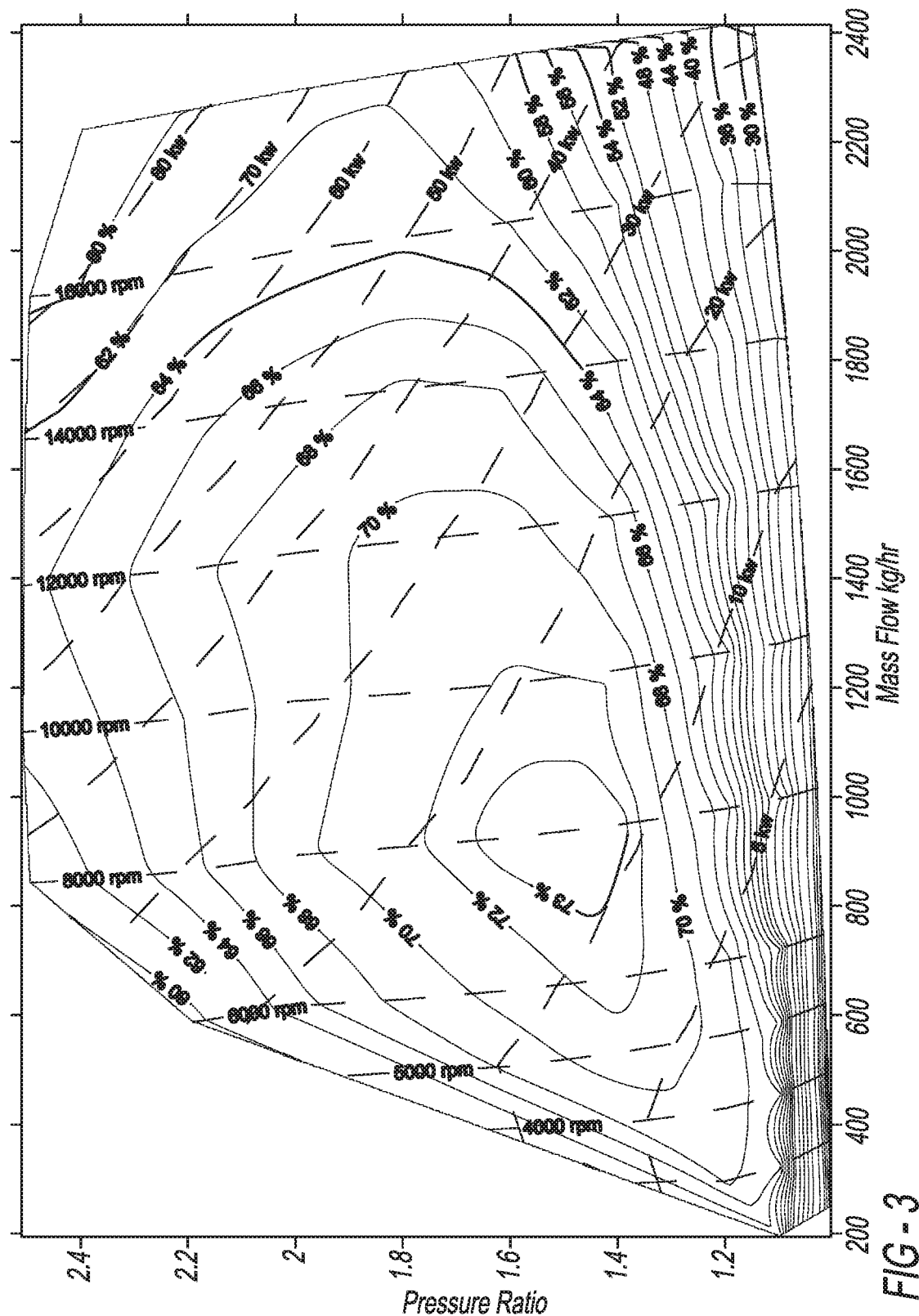
FIG. 3 is a performance map of a supercharger having 1.90 liters of displacement.

With initial reference to FIG. 1, a schematic illustration of an exemplary intake manifold assembly, including a Roots blower supercharger and bypass valve arrangement is shown. An engine 10 can include a plurality of cylinders 12, and a reciprocating piston 14 disposed within each cylinder and defining an expandable combustion chamber 16. The engine 10 can include intake and exhaust manifold assemblies 18 and 20, respectively, for directing combustion air to and from the combustion chamber 16, by way of intake and exhaust valves 22 and 24, respectively.

The intake manifold assembly 18 can include a positive displacement rotary blower 26, or supercharger of the Roots type. Further description of the rotary blower 26 may be found in commonly owned U.S. Pat. Nos. 5,078,583 and 5,893,355, which are expressly incorporated herein by reference. The blower 26 includes a pair of rotors 28 and 29, each of which includes a plurality of meshed lobes. As used herein, "rotor lead" is used to denote a linear distance along a lobe required to make one complete rotation around a rotor. The rotors 28 and 29 are disposed in a pair of parallel, transversely overlapping cylindrical chambers 28c and 29c, respectively. The rotors 28 and 29 may be driven mechanically by engine crankshaft torque transmitted thereto in a known manner, such as by a drive belt (not specifically shown). The mechanical drive rotates the blower rotors 28 and 29 at a fixed ratio, relative to crankshaft speed, such that the displacement of the blower 26 is greater than the engine displacement, thereby boosting or supercharging the air flowing to the combustion chambers 16.

The blower 26 can include an inlet port 30 which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at reference 38. If the engine 10 is of the Otto cycle type, a throttle valve 40 can control air or air-fuel mixture flowing into the intake duct 32 from a source, such as ambient or atmospheric air, in a well know manner. Alternatively, the throttle valve 40 may be disposed downstream of the supercharger 26.

A bypass valve 42 is disposed within the bypass passage 38. The bypass valve 42 can be moved between an open position and a closed position by means of an actuator assembly 44. The actuator assembly 44 can be responsive to fluid pressure in the inlet duct 32 by a vacuum line 46. The actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of a suitable linkage. The bypass valve 42 shown and described herein is merely exemplary and other configurations are contemplated. In this regard, a modular (integral) bypass, an electronically operated bypass, or no bypass may be used.

In designing a supercharger for a given application, one goal is to provide a supercharger that offers peak efficiency. In general, thermal efficiency of a supercharger can be defined by how well a supercharger takes air from one state to another state relative to how the temperature rises. In one example a supercharger's performance can be compared to the ideal gas law or PV=nRT. If perfect compression existed in a supercharger, the supercharger would be considered 100% efficient. In application, a goal is to attain efficiency as close to 100% at some speed and some pressure ratio.

With reference to FIG. 1A, and FIGS. 2-4, a performance map for an R340 supercharger 26A (FIG. 2) and an R1900 supercharger 26B (FIG. 3) is shown. The performance map plots pressure ratio against rotor speed. A pressure ratio denotes an outlet air pressure divided by an inlet air pressure of the supercharger. An R340 supercharger 26A is used to denote a supercharger that makes 0.34 liters of air displacement per each revolution. As used herein, the numerical suffix after the "R" represents a liter of air displacement divided by 1000. FIG. 4 is a table that illustrates various dimensions for a given supercharger of a plurality of superchargers 48. A lead 50 is shown for each supercharger of the plurality of superchargers 48. A lead of a supercharger can be a linear distance required to make one complete rotation around the rotor. As shown, supercharger 26A has a lead 50A of 216 mm. Similarly, supercharger 26B has a lead 50B of 393.8 mm. Other dimensions are shown for a remainder of superchargers of the plurality of superchargers 48.

Figure 5:
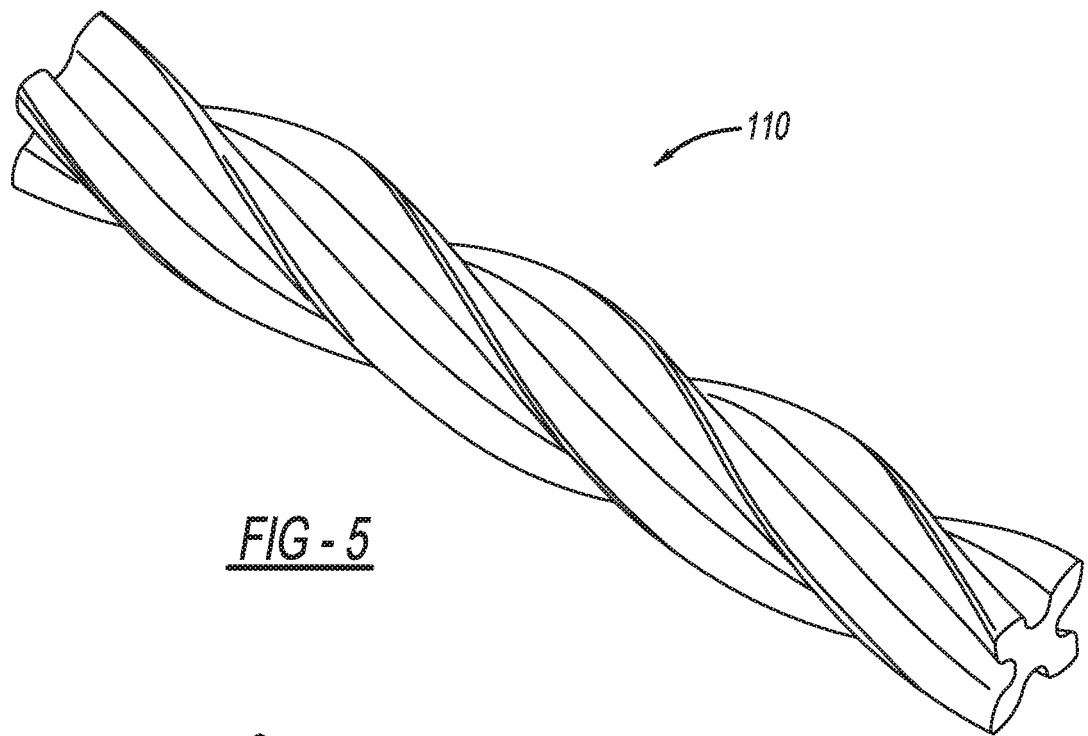
FIG. 5 is a side perspective view of a high lead rotor according to one example.
Figure 6:
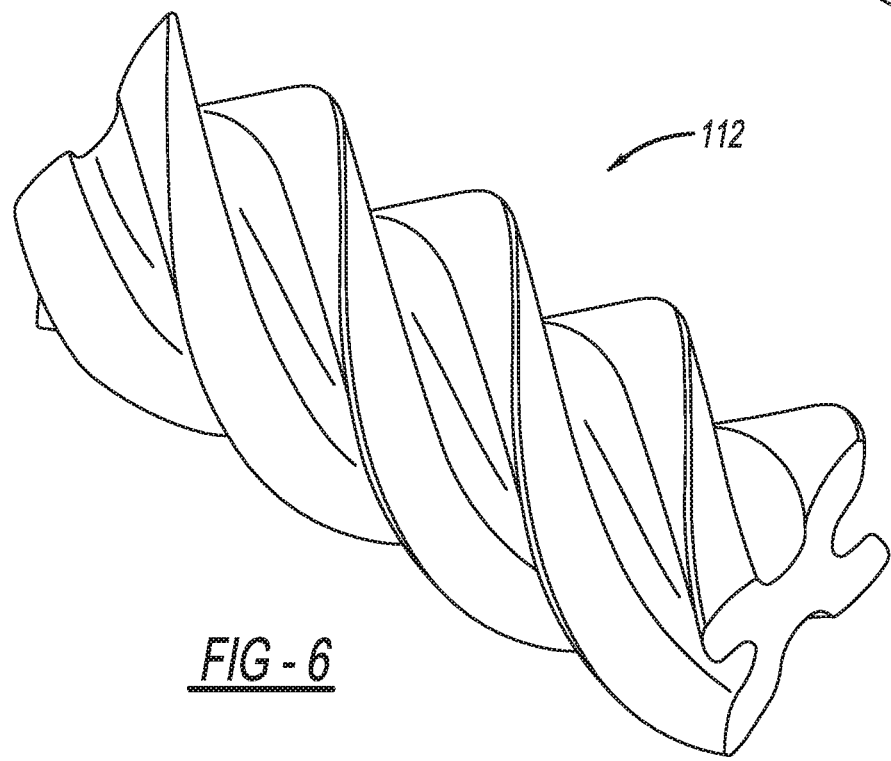
FIG. 6 is a side perspective view of a low lead rotor according to one example.

FIGS. 5 and 6 illustrate a pair of rotors 110 and 112. The rotor 110 has a relatively high lead and low helix whereas the rotor 112 has a relatively low lead and high helix. As is known, rotational speed multiplied by lead equals axial velocity. FIG. 7 is a table illustrating a velocity map for a range of superchargers. Again the model identifies superchargers having various liters of air output per revolution. The first horizontal row identifies an RPM of the rotor. The body of the table illustrates a velocity of air in meters/second. For example, the model R200 (0.2 liter of air output per revolution) rotating at 6000 RPM will move air at 15 meters per second.

Figure 8:
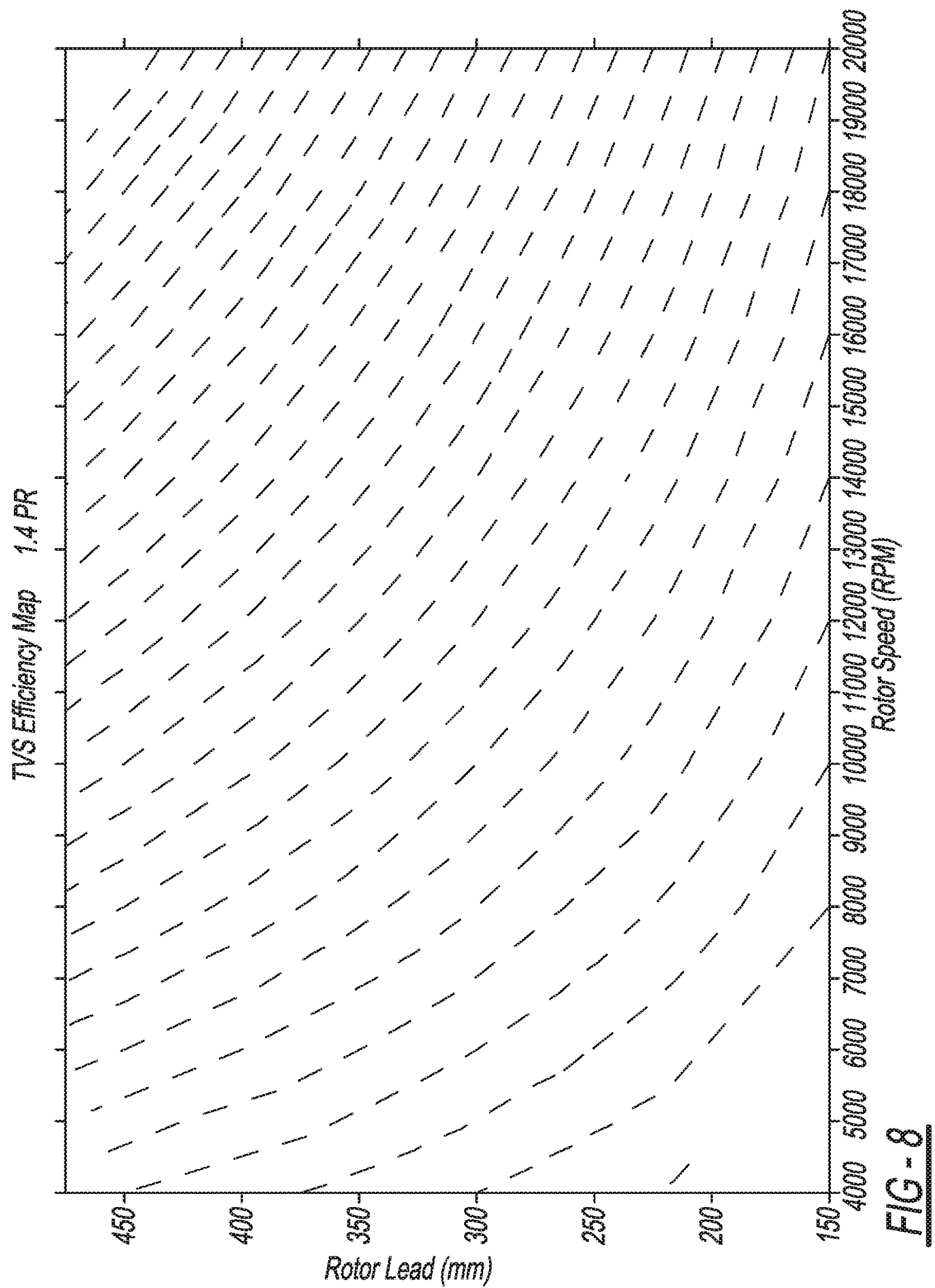
FIG. 8 is plot illustrating rotor lead versus rotor speed for superchargers having various displacements.
Figure 10:
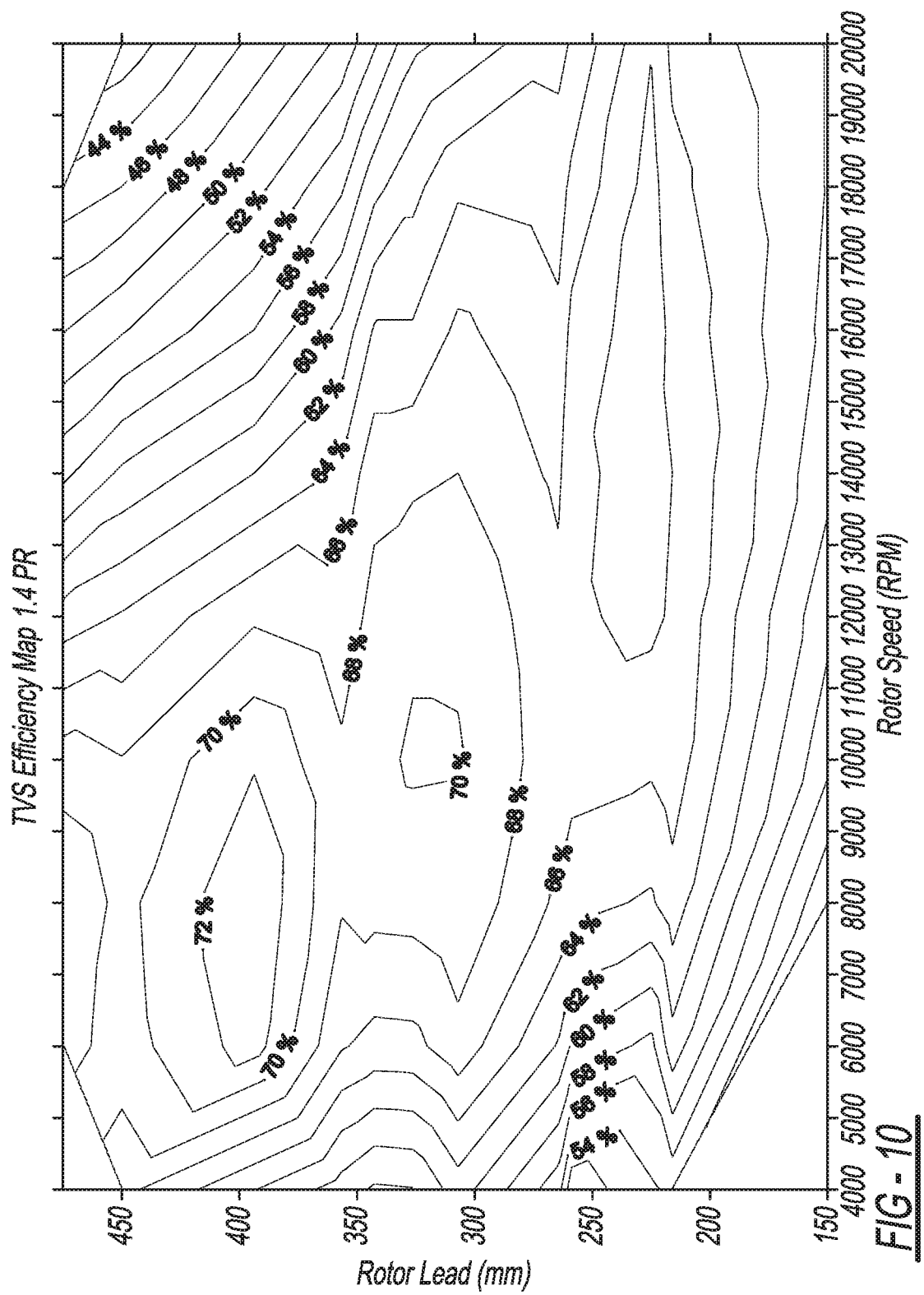
FIG. 10 is a plot illustrating performance of superchargers having various displacements at 1.4 pressure ratio.
Figure 11:
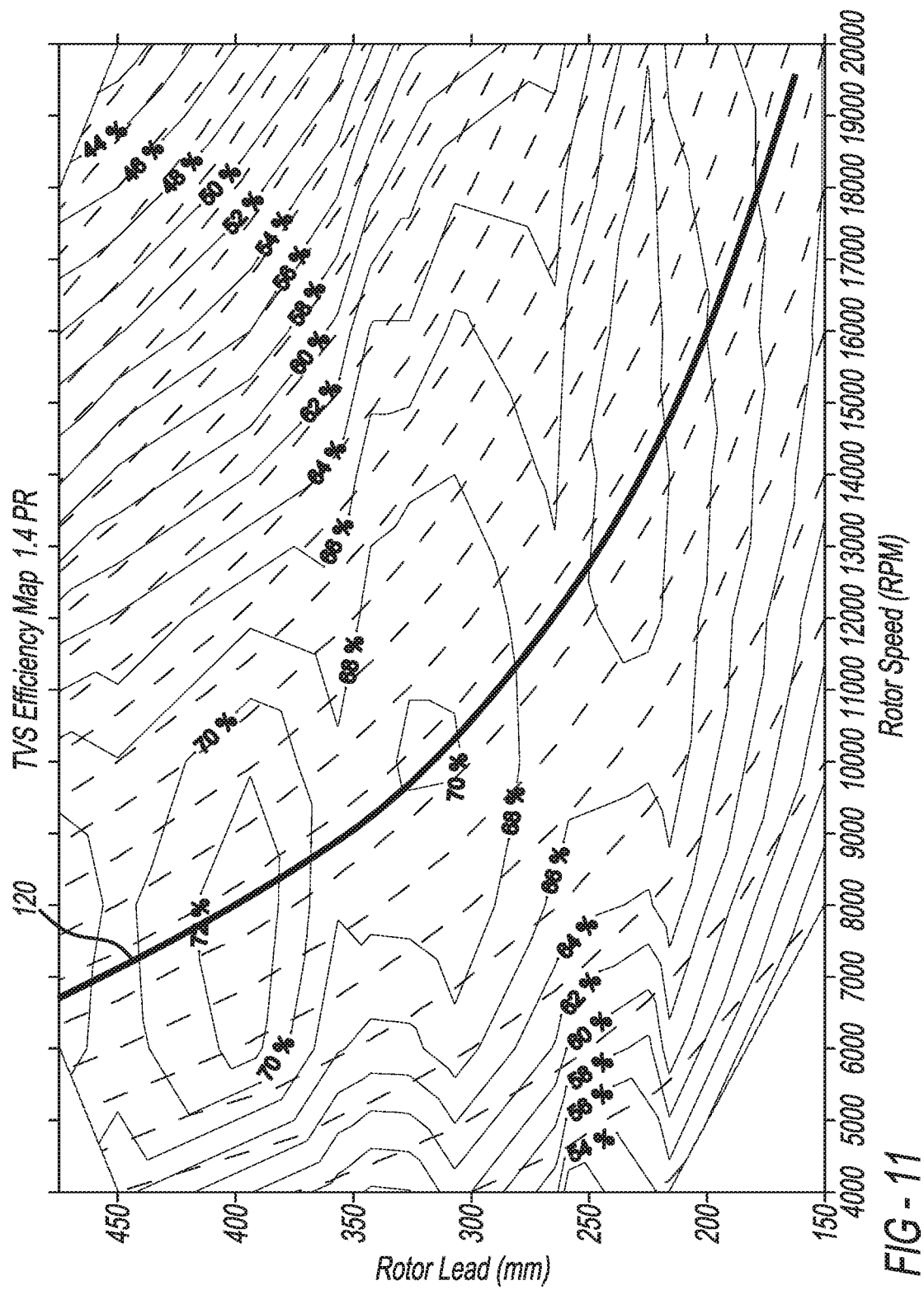
FIG. 11 is the plot of FIG. 10 and further illustrating an optimal efficiency provided by a rotor speed.

FIG. 8 is a plot illustrating the speed of a lead profile. FIG. 9 is a table that shows various supercharger models 48 (R200-R2300) set for a pressure ratio 52 of 1.4 and operated at various speeds 56 shown in revolutions per minute (RPM). The highest isentropic efficiencies are shaded. For example, the R410 supercharger 26C achieves its highest efficiency of 66.8 at 10,000 rotor RPM. FIG. 10 is an efficiency map for various supercharger models set for a pressure ratio of 1.4. The islands identify highest thermal efficiencies. For example, a supercharger having a lead of 400, the highest efficiency of around 72% occurs around 7,000 rotor RPM. FIG. 11 identifies bold line 120 at about a determined m/s for a pressure ratio of 1.4. The bold line 120 signifies the highest thermal efficiencies are realized for lead speed of about a determined m/s.

Figure 12:
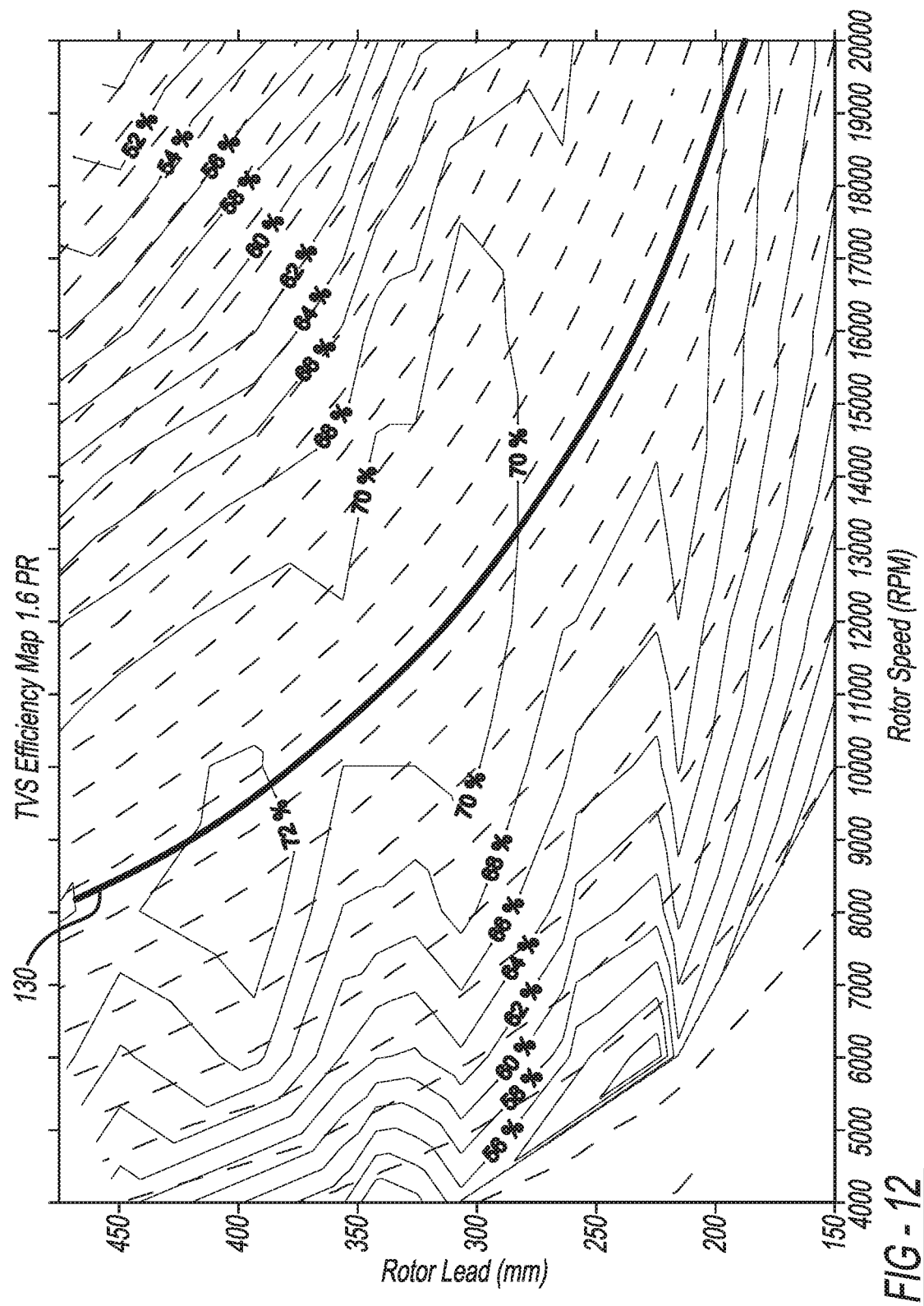
FIG. 12 is a plot illustrating performance of superchargers having various displacements at 1.6 pressure ratio and further illustrating an optimal efficiency provided by a rotor speed.
Figure 13:
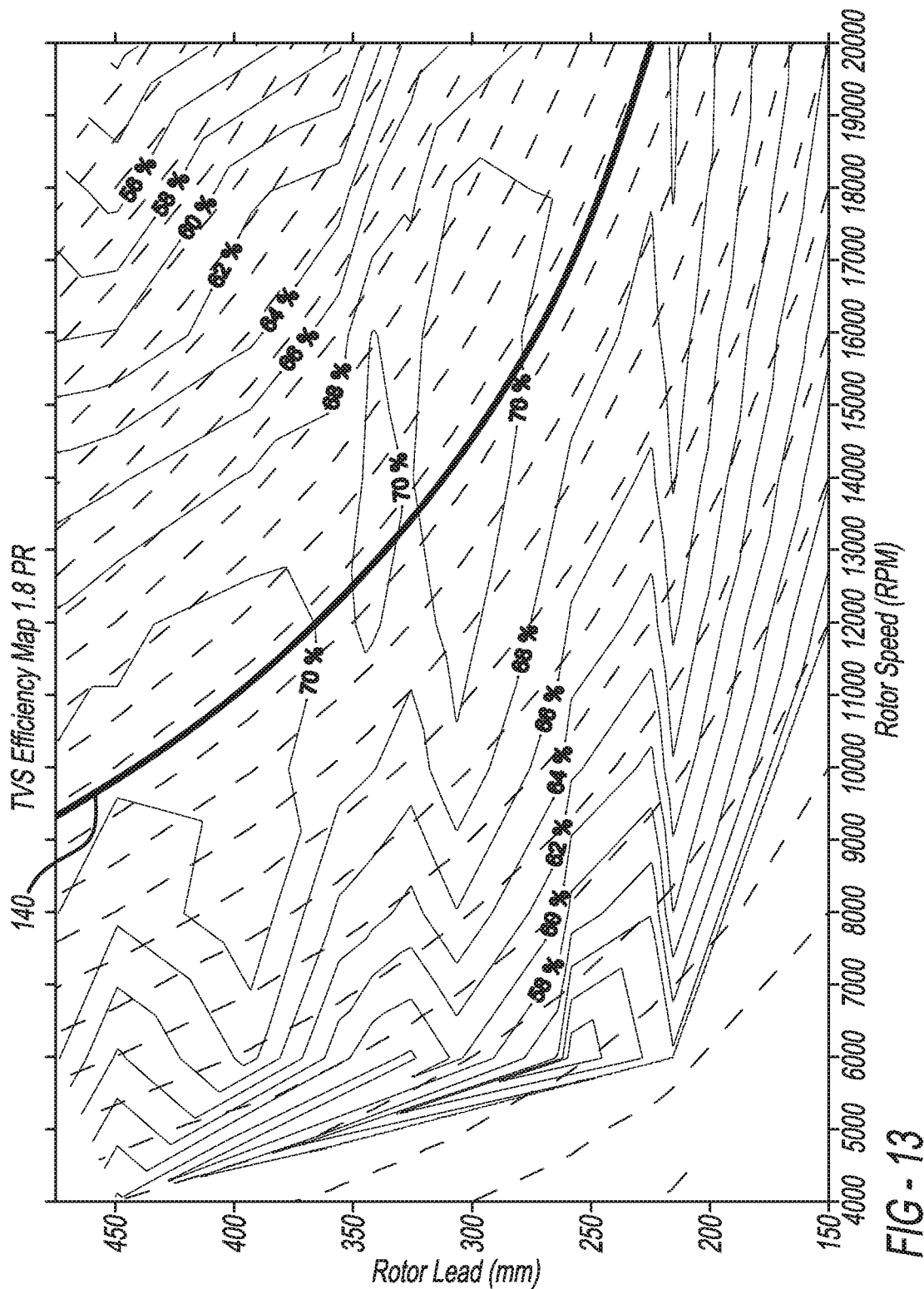
FIG. 13 is a plot illustrating performance of superchargers having various displacements at 1.8 pressure ratio and further illustrating an optimal efficiency provided by a rotor speed.
Figure 14:
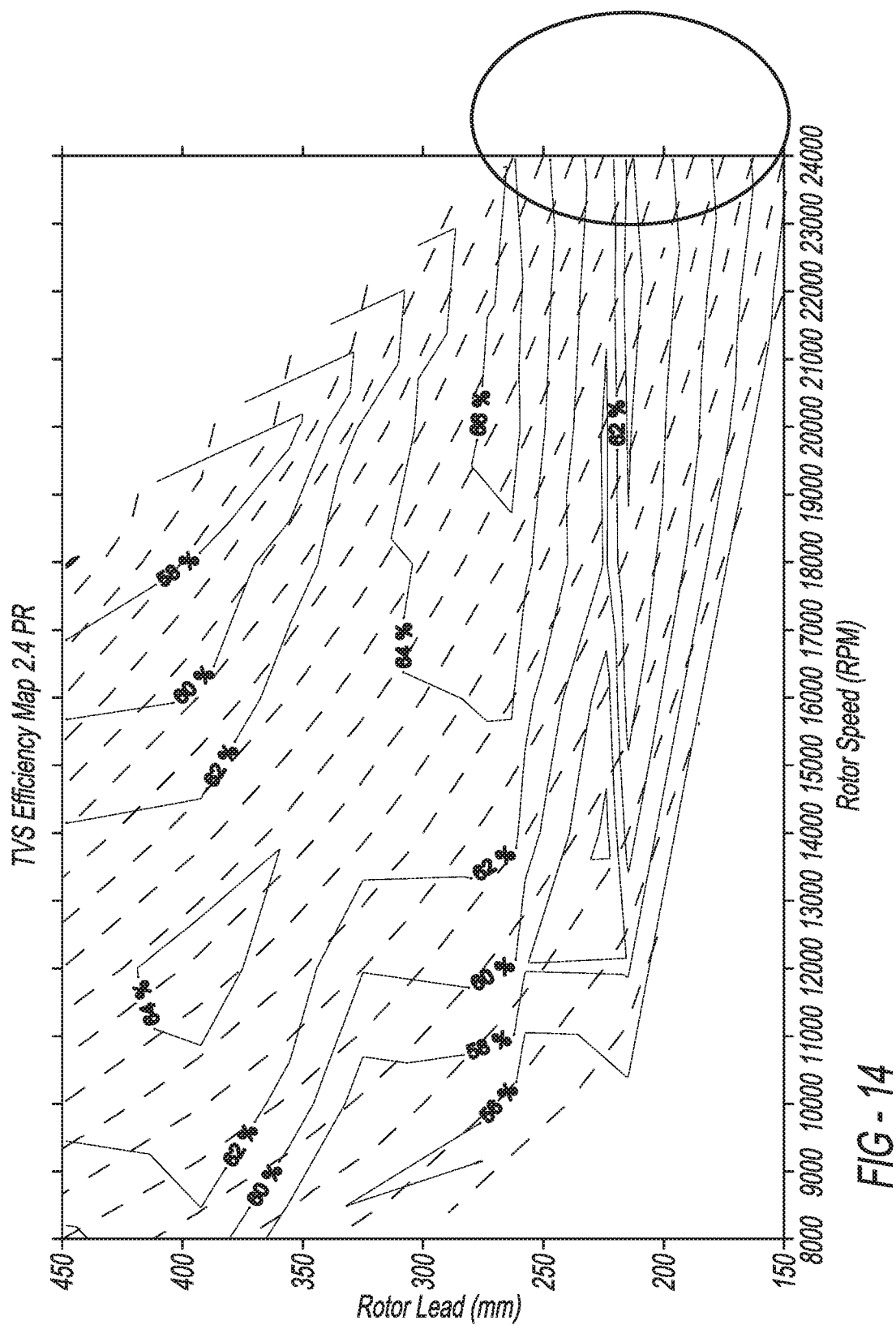
FIG. 14 is a plot illustrating performance of superchargers having various displacements at 2.4 pressure ratio and further illustrating that small units have a peak efficiency outside of the plot range.
Figure 15:
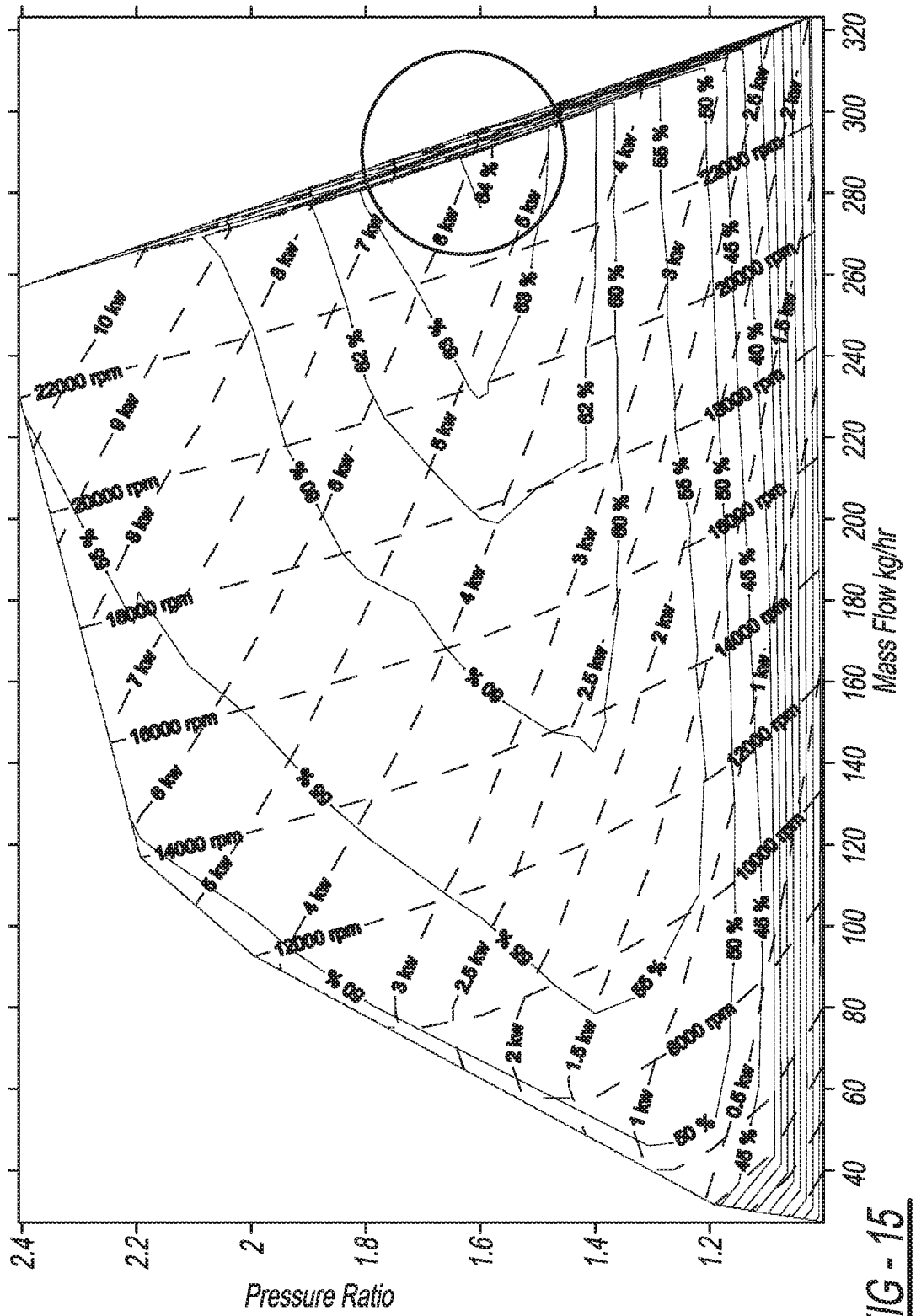
FIG. 15 is a plot of pressure ratio versus mass flow for a supercharger having 0.2 liter of displacement.

FIG. 12 is a similar graphical representation as FIG. 11 but for superchargers set for 1.6 pressure ratios. In this example, the highest thermal efficiencies are realized at the bold line 130, or for a lead speed of about a determined m/sec. FIG. 13 is another graphical representation where the superchargers are set for 1.8 pressure ratio. In this example, the highest thermal efficiencies are realized at bold line 140, or for a lead speed of about a determined m/sec. FIG. 14 is another graphical representation where the superchargers are set for 2.4 pressure ratio. In this example, the highest efficiencies for the smallest units are outside the range of the plot. In other words, the highest efficiencies require speeds above 24,000 rotor RPM. In general, referring to FIGS. 11-14, the higher the desired pressure ratio, the higher the lead speeds will need to be to reach the peak efficiencies. FIG. 15 illustrates a performance map of pressure ratio versus mass airflow. The peak efficiency is on the edge of normal operating range.

FIGS. 16 and 17 are tables indicating various superchargers running at various RPM's and attaining various lead velocities. Certain conclusions can be made from the above FIGS. In general, the lead controls the location of the peak efficiency in the supercharger speed range. Moreover, using the tables shown in FIGS. 16 and 17 along with the maps shown in FIGS. 11-13, a supercharger can be designed to attain a peak efficiency (bold lines, FIGS. 11-13) based on a given rotor speed and rotor lead. Explained further, should a particular supercharger application require operation at a particular pressure ratio, the rotor lead and rotor speed can be chosen to provide a supercharger that reaches peak efficiency. For example, should a supercharger application require operation at 1.4 pressure ratio (FIG. 11), and a rotor lead of 300 mm, the supercharger should be configured for operation at about 11,000 RPM. Similarly, should the supercharger require operation at 1.4 pressure ratio, and a rotor lead of 400 mm, the supercharger should be configured for operation at about 7,500 RPM. Again, the goal is to align with the peak efficiency bold line 120 that extends through the peak efficiency islands.

In other examples, referring to a supercharger application that requires operation at 1.6 pressure ratio (FIG. 12), and a rotor lead of 300 mm, the supercharger should be configured for operation at about 12,500 RPM. With continued reference to FIG. 12, according to other examples of a supercharger application that requires operation at 1.6 pressure ratio and a rotor lead of 400 mm, the supercharger should be configured for operation at about 9,500 RPM.

Turning now to FIG. 13, referring to a supercharger application that requires operation at 1.8 pressure ratio and a rotor lead of 300 mm, the supercharger should be configured for operation at about 15,000 RPM. With continued reference to FIG. 13, according to other examples of a supercharger application that requires operation at 1.8 pressure ratio and a rotor lead of 400 mm, the supercharger should be configured for operation at about 10,500 RPM. It will be appreciated that for all these examples shown such as in FIGS. 11-13, with two variables known (two of pressure ratio, rotor speed and rotor lead), the third can be determined based on the efficiency maps.

In some instances, a small unit's lead can be too low to reach peak efficiency at higher pressure ratios. Modifying a helix angle can broaden the efficiency map. Efficiencies at high speed indicate velocities of 120 m/s can be too high. Lead should be low enough as to not reach such axial speeds in the RPM range.

Figure 18:
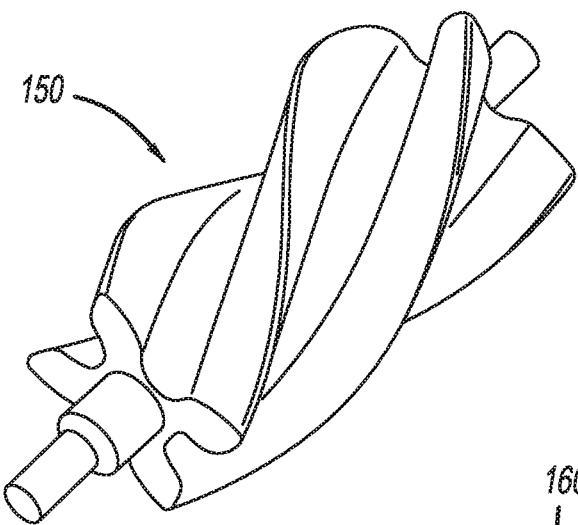
FIGS. 18-20 illustrates various rotors having 0.41 liter of displacement with different leads and helix angles.
Figure 19:
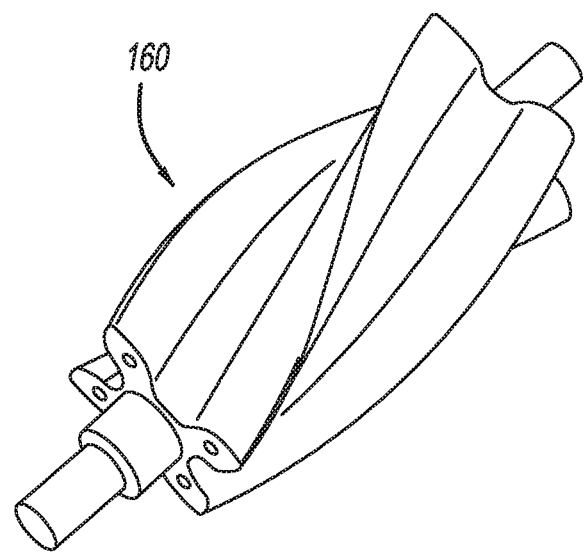
Figure 20:
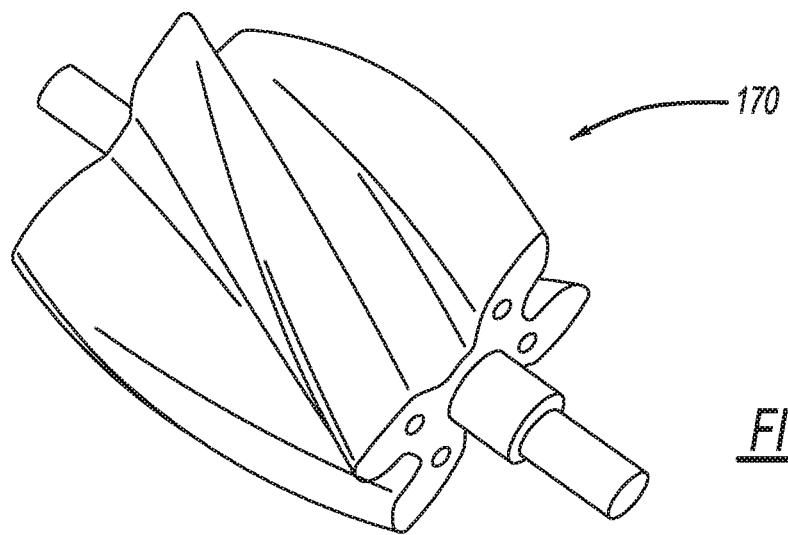
Figure 21:
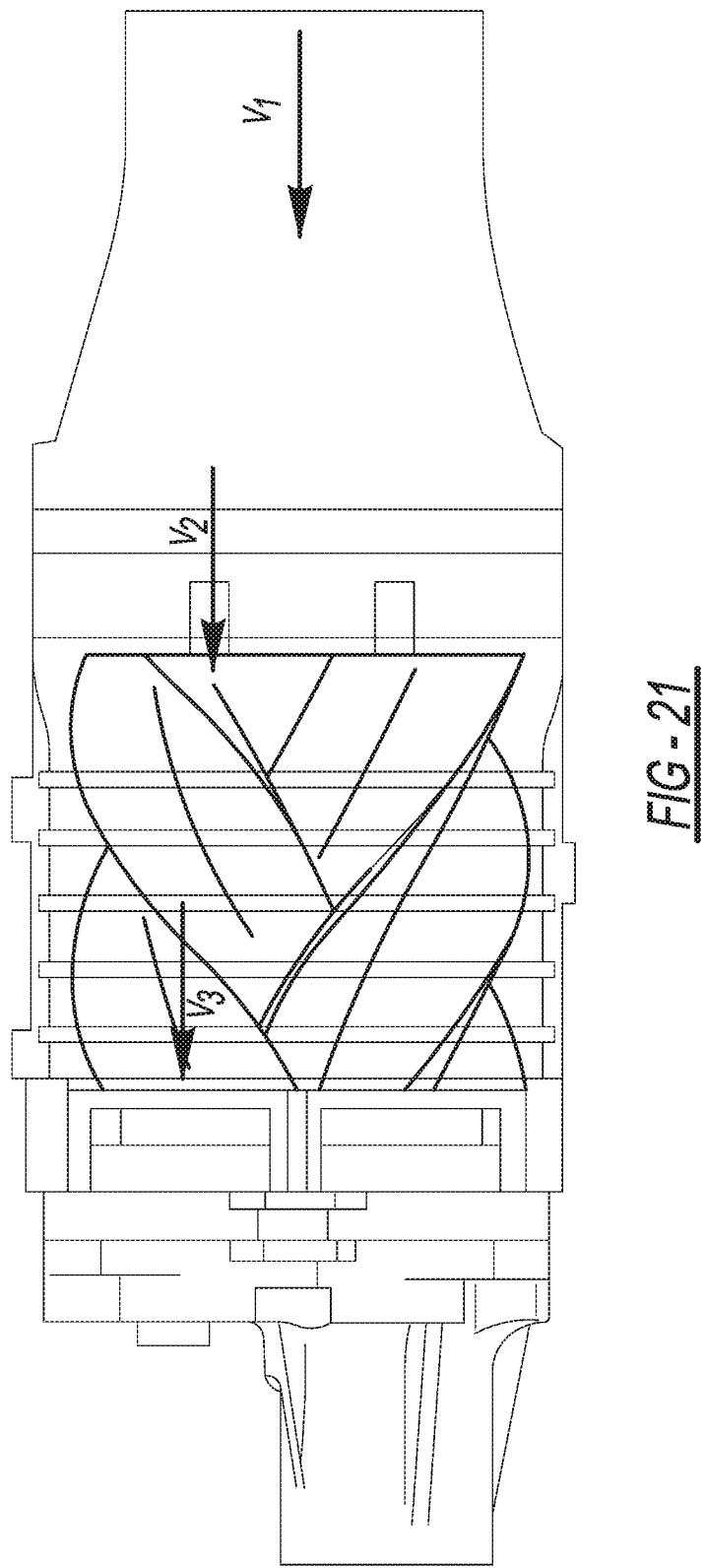
FIG. 21 illustrates velocity profile adaptation to lead including a lead velocity profile and an air velocity profile.

Referring to FIGS. 18-20, various rotors are shown. Rotor 150 (FIG. 18) is an R410 having a 264 mm lead and a 27 degree helix. Rotor 160 (FIG. 19) is an R410 having a 380 mm lead and a 19 degree helix. Rotor 170 (FIG. 20) is an R410 having a 380 mm lead and a 30 degree helix. With reference to FIG. 21, a supercharger is shown having velocities $V_1$, $V_2$ and $V_3$. The velocity $V_1$ identifies the duct air speed based on the area of the supercharger and the flow rate. The velocity $V_2$ identifies the lead rotational speed. In general, $V_1$ is lower than $V_2$. The velocity $V_3$ is zero where the air engages the bearing plate. Once the air engages the bearing plate the velocity is converted to pressure.

Figure 22:
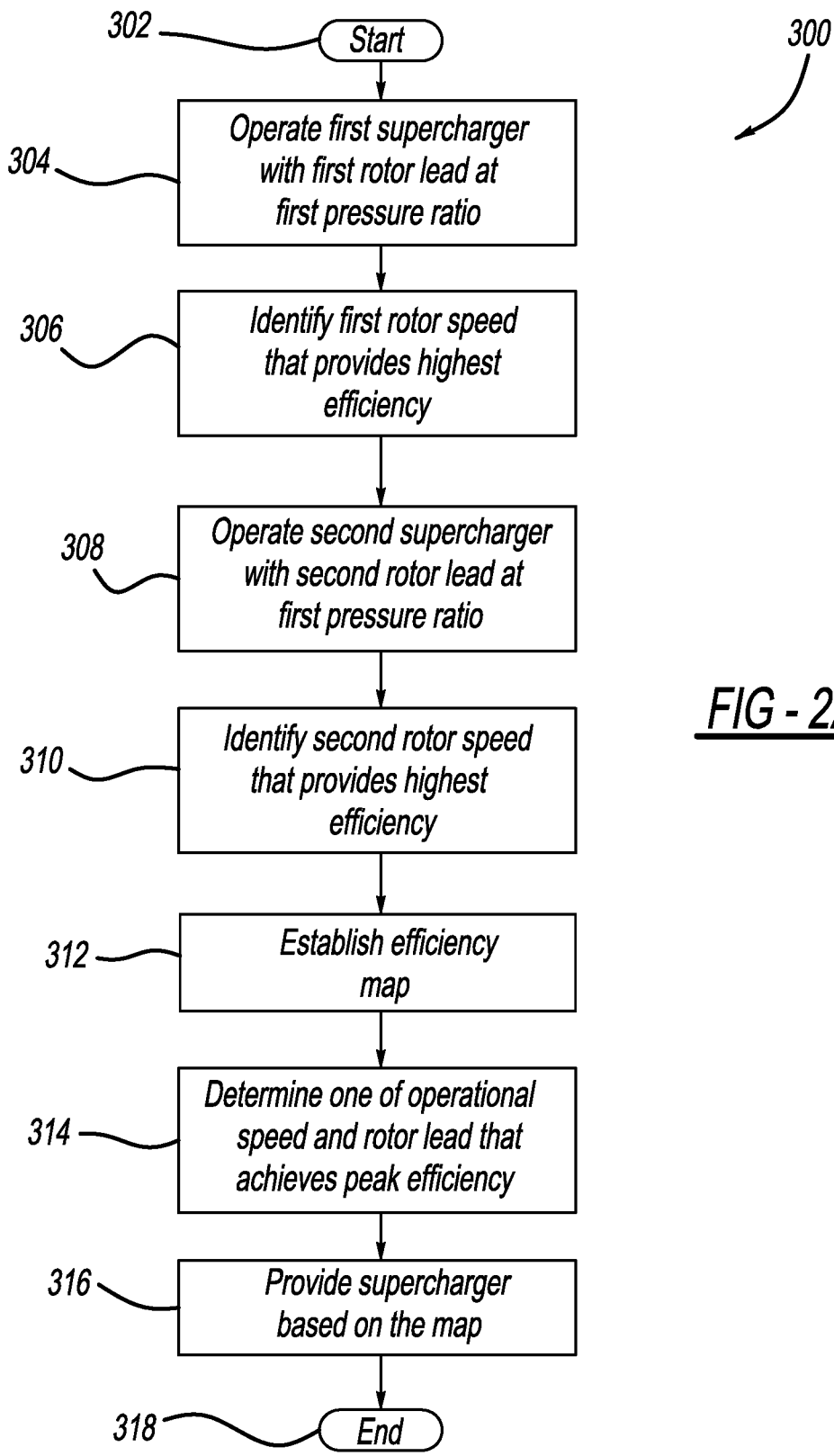
FIG. 22 is a method according to the present teachings.

FIG. 22 illustrates a method 300 of providing a supercharger 48 with optimized performance as described above. In particular, the method starts at 302. A first supercharger, such as supercharger 26A (FIG. 9), is operated with a first rotor lead 50A at a first pressure ratio, such as pressure ratio 52, at 304. A first rotor speed that provides a highest thermal efficiency for the first supercharger is identified at 306. For example, as shown in FIG. 9, an efficiency of 68.0 is achieved while operating at 14,000 RPM. A second supercharger, such as supercharger 26B (FIG. 9) is operated with a second rotor lead 50B at the first pressure ratio, such as pressure ratio 52, at 308. A second rotor speed that provides a highest thermal efficiency for the second supercharger is identified at 310. For example, as shown in FIG. 9, an efficiency of 73.8 is achieved while operating at 8,000 RPM. An efficiency map is established at 312, such as the efficiency map shown in FIG. 10. The efficiency map identifies a series of rotor lead 50 and rotor speed 56 combinations that achieve highest thermal efficiencies for a plurality of superchargers 48 operating at the first pressure ratio 52. An operational speed 56 is determined at 314 that achieves peak efficiency for a proposed supercharger application requiring a fixed pressure ratio 52 and a fixed rotor lead 50 based on the efficiency map. A supercharger, such as supercharger 26A, 26B, 26C from the superchargers 48, is provided at 316 having the fixed pressure ratio 52, the fixed rotor lead 50 and that is configured to operate at the determined operational speed 56. The method ends at 318.

The instant teachings provide a method of optimizing the isometric efficiency of a supercharger based on data from multiple superchargers (with different lead values) at a specific pressure ratio condition. An efficiency map of rotor lead versus rotor operating speed is generated for a single pressure ratio. The map is then used to determine a rotor lead value based on a pressure ratio and speed combination which yields the highest possible isometric efficiency given a single pressure ratio value and selected speed. A supercharger is then designed and provided with the determined rotor lead.

The instant teachings also provide a method to determine which speed an optimal isometric efficiency of a supercharger will occur based on data from multiple superchargers (with different lead values) at a specific pressure ratio condition. An efficiency map of rotor lead versus rotor operating speed is generated for a single pressure ratio. The map is then used to determine a rotor operating speed value based on a pressure ratio and rotor lead combination which yields the highest possible isometric efficiency given a single pressure ratio value and selected lead. A supercharger is then designed and provided that is configured to operate at the determined speed with the determined rotor lead.

The instant methods allow a supercharger 48 to be designed and thereafter provided to a customer. The supercharger 48 can be optimized based on a customer having fixed requirements of two variables (two of pressure ratio 52, rotor speed 56 and rotor lead 50). The remaining variable can be determined based on efficiency maps, such as the efficiency maps illustrated in FIGS. 11-13. The instant method recognizes that not every vehicle can accommodate a supercharger having a large footprint. In fact many times a customer has a fixed pressure ratio that they require, such as one of the pressure ratios 1.4 (FIG. 11), 1.8 (FIG. 12) or 2.4 (FIG. 13) and are requesting an optimal rotor lead 50 and/or operational speed 56 that provides the best efficiency possible. The solution the instant application provides is a method to reach the best available efficiency by selecting an alterable design parameter based on customer design constraints that cannot be altered.

The foregoing description of the embodiments has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of designing a supercharger that yields a high isometric efficiency based on a fixed pressure ratio, a plurality of rotor leads and a plurality of rotor operating speeds, the method comprising:
    generating an efficiency map of rotor lead versus rotor operating speed for the fixed pressure ratio;
    determining a rotor lead value based on the fixed pressure ratio and rotor speed combination from the efficiency map that yields the high isometric efficiency; and
    providing the supercharger having the determined rotor lead and that is configured to operate with the fixed pressure ratio and the determined rotor operating speed.

2. The method of claim 1 wherein the rotor lead is between 250 mm and 350 mm based on the fixed pressure ratio of 1.4 and the fixed rotor speed of between 9,000 RPM and 12,500 RPM.

3. The method of claim 1 wherein the rotor lead is between 375 mm and 350 mm based on the fixed pressure ratio of 1.4 and the fixed rotor speed of between 6,000 RPM and 9,000 RPM.

4. The method of claim 1 wherein the rotor lead is between 300 mm and 450 mm based on the fixed pressure ratio of 1.6 and the fixed rotor speed of between 8,000 RPM and 12,000 RPM.

5. The method of claim 1 wherein the rotor lead is 275 mm and 325 mm based on the fixed pressure ratio of 1.8 and the fixed rotor speed of 13,000 RPM and 17,000 RPM.

6. The method of claim 1 wherein the rotor lead is between 375 mm and 425 mm based on the fixed pressure ratio of 1.8 and the fixed rotor speed of between 9,000 RPM and 12,000 RPM.

7. A method of designing a supercharger that yields a high isometric efficiency based on a fixed pressure ratio, a plurality of rotor leads and a plurality of rotor operating speeds, the method comprising:
    generating an efficiency map of rotor lead versus rotor operating speed for the fixed pressure ratio;
    determining a rotor operating speed value based on the fixed pressure ratio and rotor lead combination from the efficiency map that yields the high isometric efficiency; and
    providing the supercharger having the determined rotor lead and that is configured to operate with the fixed pressure ratio and the determined rotor operating speed.

8. The method of claim 7 wherein the rotor lead is between 250 mm and 350 mm based on the fixed pressure ratio of 1.4 and the fixed rotor speed of between 9,000 RPM and 12,500 RPM.

9. A method of designing a supercharger that yields a high isometric efficiency based on a fixed pressure ratio, a plurality of rotor leads and a plurality of rotor operating speeds, the method comprising:
operating a first supercharger with a first rotor lead at the fixed pressure ratio;
identifying a first rotor speed that provides a highest thermal efficiency for the first supercharger;
operating a second supercharger with a second rotor lead at the fixed pressure ratio;
identifying a second rotor speed that provides a highest thermal efficiency for the second supercharger;
establishing an efficiency map that identifies a series of rotor lead and rotor speed combinations that achieve highest thermal efficiencies for a plurality of superchargers operating at the fixed pressure ratio;
determining a rotor lead that achieves peak efficiency for a proposed supercharger application requiring the fixed pressure ratio and a fixed rotor speed based on the efficiency map; and
providing the supercharger having the fixed pressure ratio and the determined rotor lead and that is configured to operate at the fixed rotor speed.

10. The method of claim 9 wherein the rotor lead is between 250 mm and 350 mm based on the fixed pressure ratio of 1.4 and the fixed rotor speed of between 9,000 RPM and 12,500 RPM.

11. The method of claim 9 wherein the rotor lead is between 375 mm and 350 mm based on the fixed pressure ratio of 1.4 and the fixed rotor speed of between 6,000 RPM and 9,000 RPM.

12. The method of claim 9 wherein the rotor lead is between 300 mm and 450 mm based on the fixed pressure ratio of 1.6 and the fixed rotor speed of between 8,000 RPM and 12,000 RPM.

13. The method of claim 9 wherein the rotor lead is 275 mm and 325 mm based on the fixed pressure ratio of 1.8 and the fixed rotor speed of 13,000 RPM and 17,000 RPM.

14. The method of claim 9 wherein the rotor lead is between 375 mm and 425 mm based on the fixed pressure ratio of 1.8 and the fixed rotor speed of between 9,000 RPM and 12,000 RPM.

15. A method of designing a supercharger that yields a high isometric efficiency based on a fixed pressure ratio, a plurality of rotor leads and a plurality of rotor operating speeds, the method comprising:
operating a first supercharger with a first rotor lead at the fixed pressure ratio;
identifying a first rotor speed that provides a highest thermal efficiency for the first supercharger;
operating a second supercharger with a second rotor lead at the fixed pressure ratio;
identifying a second rotor speed that provides a highest thermal efficiency for the second supercharger;
establishing an efficiency map that identifies a series of rotor lead and rotor speed combinations that achieve highest thermal efficiencies for a plurality of superchargers operating at the fixed pressure ratio;
determining an operational speed that achieves peak efficiency for a proposed supercharger application requiring the fixed pressure ratio and a fixed rotor lead based on the efficiency map; and
providing the supercharger having the fixed pressure ratio, the fixed rotor lead and that is configured to operate at the determined operational speed.

16. The method of claim 15 wherein the rotor lead is between 250 mm and 350 mm based on the fixed pressure ratio of 1.4 and the fixed rotor speed of between 9,000 RPM and 12,500 RPM.

17. The method of claim 15 wherein the rotor lead is between 375 mm and 350 mm based on the fixed pressure ratio of 1.4 and the fixed rotor speed of between 6,000 RPM and 9,000 RPM.

18. The method of claim 15 wherein the rotor lead is between 300 mm and 450 mm based on the fixed pressure ratio of 1.6 and the fixed rotor speed of between 8,000 RPM and 12,000 RPM.

19. The method of claim 15 wherein the rotor lead is 275 mm and 325 mm based on the fixed pressure ratio of 1.8 and the fixed rotor speed of 13,000 RPM and 17,000 RPM.

20. The method of claim 15 wherein the rotor lead is between 375 mm and 425 mm based on the fixed pressure ratio of 1.8 and the fixed rotor speed of between 9,000 RPM and 12,000 RPM.

* * * * *